United States Patent Office 3,416,310
Patented Dec. 17, 1968

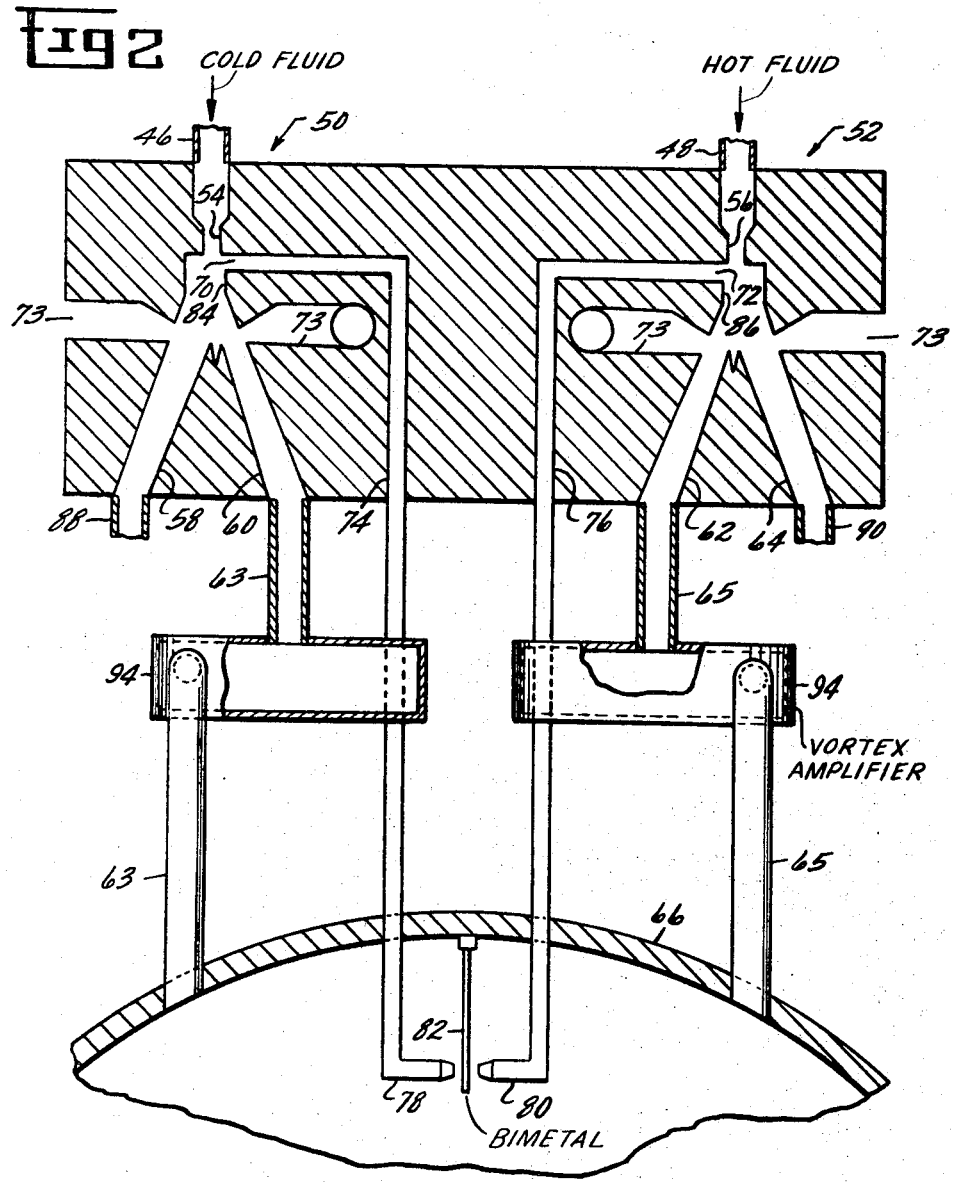

3,416,310
FLUID TEMPERATURE CONTROLS PARTICULARLY FOR GAS TURBINE ENGINES
Willis A. Boothe, Scotia, N.Y., assignor to General Electric Company, a corporation of New York
Original application Oct. 22, 1965, Ser. No. 500,697, now Patent No. 3,383,038, dated May 14, 1968. Divided and this application Oct. 20, 1967, Ser. No. 684,091
3 Claims. (Cl. 60—39.28)

ABSTRACT OF THE DISCLOSURE

A fluid temperature control for providing a speed reference signal insensitive to the changes in the ambient operating temperature of a gas turbine engine. The reference signal generating means includes a chamber which has a fluid pressure signal input having a frequency proportionate to the rate of turbine rotation. The chamber is flushed with a constant temperature gas derived from the engine so that changes in the input signal thereto result in changes in its output strength, whereby an error signal may be derived to vary fuel flow and thus maintain the turbine at a desired rate of rotation.

Figure 1:
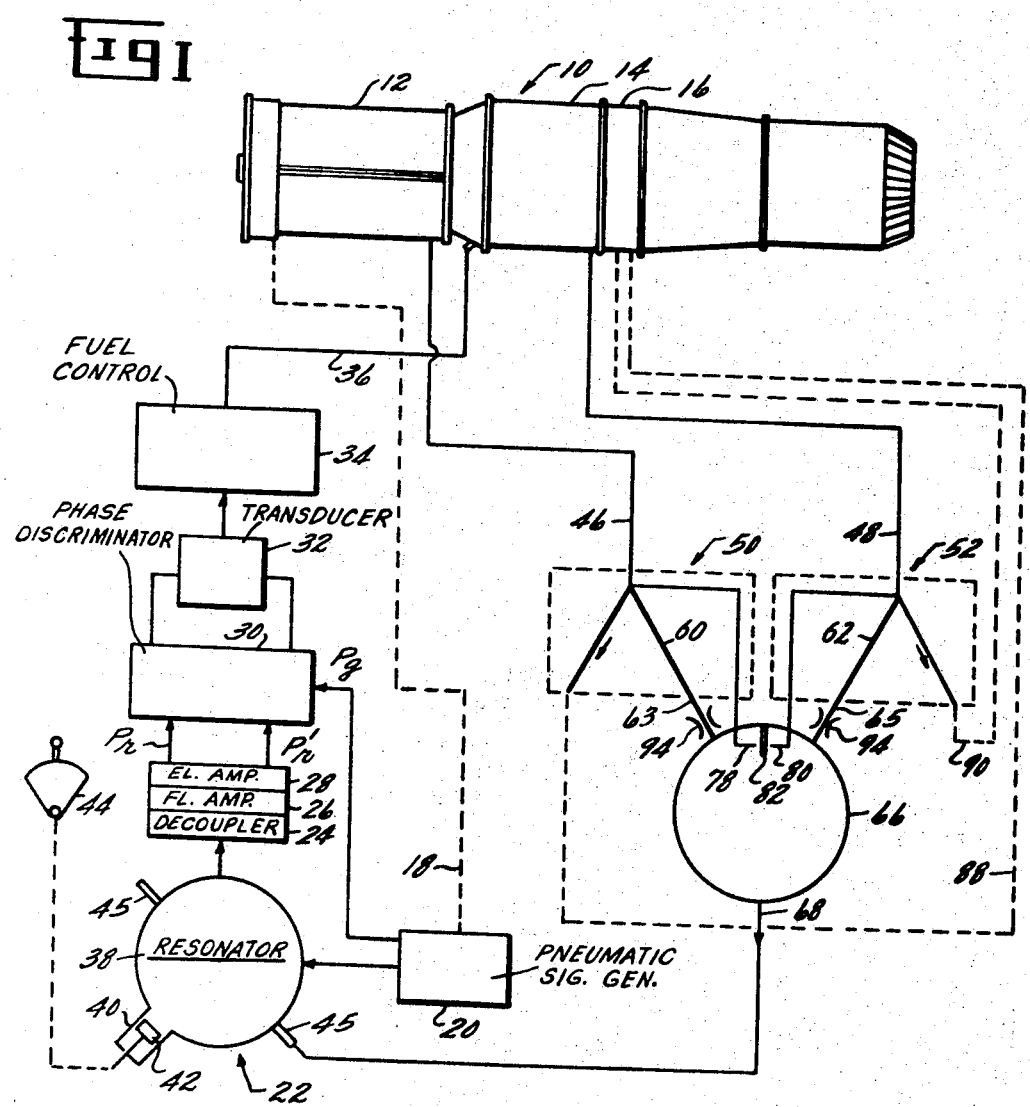

The constant temperature gas for the chamber is derived from a plenum which has inputs respectively connected to the engine compressor discharge and the turbine inlet. Flow dividers divert hot or cool air into the plenum to maintain a desired temperature. The flow dividers have control ports which either divert the hot or cool air to the plenum or divert it back to the engine gas stream. A bimetal element in the plenum is effective against conduits connected to these control ports to control their pressurization for the described diverting function.

---

This is a divisional application of application Ser. No. 500,697, filed Oct. 22, 1965, and assigned to the assignee of the present application, now Patent No. 3,383,038, issued May 14, 1968.

The present invention relates to improvements in providing a constant temperature fluid source and in a more specific aspect, to improved fluid sensing means for gas turbine engines which provides an output reflecting the rate of rotation of the engine turbine.

The present invention in its more specific aspects deals with the problems of providing fluid controls for the operation of gas turbine engines. Such engines basically comprise an axial flow compressor, mechanically connected by a shaft to a turbine. Fuel fed to a combustor intermediate the compressor and turbine provides hot gases which drive the turbine to in turn drive the compressor, as well as providing output energy which may be employed either directly as a thrust or converted to kinetic energy by a free turbine. In any event an essential parameter in controlling the operation of such engines is the rate of rotation of the turbine which can be varied by the amount of fuel fed to the combustor. While other parameters may be involved, the rate of fuel flow to the combustor is desirably controlled as a direct function of turbine rotational speed.

The advantages of employing fluid controls, sometimes broadly referred to as fluid amplifiers, in the operation of gas turbine engines are considerable. Such advantages will potentialy give greater reliability, immunity to high operating temperatures which are hazardous for electronic components, as well as more economical, lighter, and compact mechanism.

One of the problems involved in the use of fluid controls is that the output of many fluid control components varies as a function of temperature. This is a particular problem in any sensing system where a fluid output is derived by the use of a reference signal that is pulsed within a chamber since the reference signal frequency is a function of the fluid temperature in such chamber. Thus there has been at least one proposal (identified below) to control engine operation through the use of such a reference signal compared to a turbine speed signal. The output obtained is not a direct function of turbine speed in that it also reflects temperature conditions.

One object of the invention is, therefore, to provide fluid control means for monitoring flow of fuel to a gas turbine engine as a direct function of the rate of rotation of its turbine or otherwise provide a fluid system output reflecting the rate of turbine rotation independently of changes in ambient temperature.

Another object of the invention is to provide improved means for deriving a substantially constant temperature source of fluid which are particularly useful in rendering fluid signals pulsed within a chamber independent of changes in the ambient temperature of the system.

The ends are obtained in a fluid sensing system for gas turbine engines having a rotating turbine by the provision of means for generating a fluid pressure signal which has a frequency proportionate to the rate of turbine rotation. Other means are provided for generating a reference signal by pulsing a gas within a chamber, with the pulsed gas being derived from the engine and maintained at a constant temperature. Pulsation frequency of the reference signal will be independent of any changes in the ambient operating temperature of the engine and this reference signal may then be compared with the fluid pressure signal proportionate to the rate of turbine rotation to obtain an output which is independent of ambient temperature changes. Preferably the constant temperature source is provided by deriving from the engine a relatively hot gas stream and a relatively cool gas stream and then mixing these hot and cool gases to obtain an intermediate constant temperature source. Advantageously the output of the sensing system is employed to control fuel flow as a direct function of turbine speed.

In the sense that the present invention provides means for supplying fluid at a constant temperature the invention is further characterized by the provision of first and second fluid flow dividers respectively connected to sources of pressurized fluid which are at different temperatures, one being relatively hot and the other being relatively cool, with cool temperature source no higher than a given temperature and the hot temperature source is no lower than this given temperature. Such flow dividers have two outputs and one output from each is connected to a plenum chamber. The flow dividers are further characterized by a control port which provides a control stream for selectively diverting fluid flow into one or the other of its outputs. These control ports are connected to the plenum chamber so that the control streams are derived therefrom. Means responsive to the temperature within the plenum chamber are provided for controlling the pressurization of said control ports so that when the temperature in the plenum is above the selected given temperature, the flow from the cooler source is diverted into the plenum and when the temperature of the plenum is below the selected temperature, fluid from the hot source is diverted therein.

The above and other related objects and features of the invention will be apparent from a reading of the following description of the disclosure found in the accompanying drawings and the novelty thereof pointed out in the appended claims.

In the drawings:

FIGURE 1 is a schematic and block diagram depiction of a preferred embodiment of the invention; and

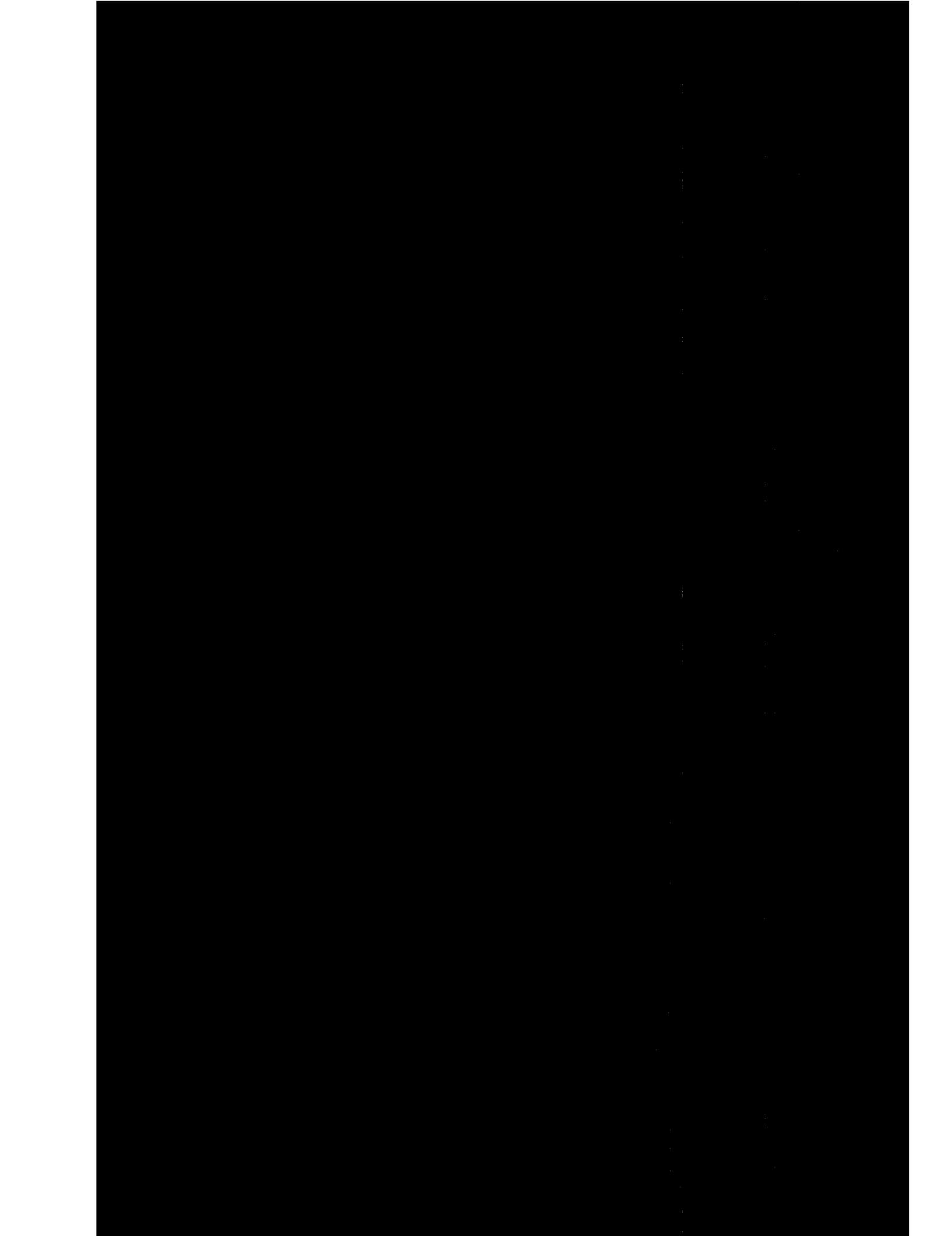

the output of the control system is a direct function of the rate of turbine rotation.

While the described means for providing a constant temperature source have unique application in accurate operation of gas turbine engines, it will, of course, be apparent to those skilled in the art that the same arrangement or modifications thereof could meet the particular demands of other systems. The scope of the invention is therefore to be derived solely from the appended claims.

Having thus described the invention, what is claimed as novel and desired to be secured by Letters Patent of the United States is:

1. In a fluid sensing system for gas turbine engines having a rotating turbine
   means for generating a fluid pressure signal having a frequency proportionate to the rate of turbine rotation,
   means including a resonator chamber for generating a reference signal, said chamber having as its pulsating input said fluid pressure signal, and
   means for deriving from said engine a constant temperature source of gas and passing it through said chamber whereby the pulsation frequency of the reference signal will be independent of any changes in the ambient operating temperature of the engine.

2. In a fluid sensing system for gas turbine engines having a rotating turbine
   means for generating a fluid pressure signal having a frequency proportionate to the rate of turbine rotation,
   means for generating a reference signal by pulsing a gas within a resonator comprising a chamber and at least one tube extending therefrom at atmosphere said chamber having as its pulsating input said fluid pressure signal,
   means for deriving relatively low temperature gas from one point of said engine,
   means for deriving relatively high temperature gas from another point in said engine,
   means for mixing the gases so derived to a predetermined temperature, and
   means for flushing the resonator with said constant temperature gas whereby the pulsation frequency of the reference signal will be independent of any changes in the ambient operating temperature of the engine.

3. A fluid control system for a gas turbine engine having a rotating turbine,
   means for generating a fluid pressure signal having a frequency proportionate to the rate of turbine rotation,
   means for generating a reference signal by pulsing a gas within a resonator comprising a chamber and at least one tube extending therefrom to atmosphere, said chamber having as its pulsating input said fluid pressure signal,
   means responsive to changes in the reference signal resulting from deviation of the turbine rate of rotation from a desired rate for controlling fuel flow to the engine to return the rate of turbine rotation to its desired rate,
   first and second fluid flow dividers respectively connected to a source of relatively cool air and a source of relatively hot air, both being derived from said engine, the source of said relatively cool gas being no higher than a given temperature and the source of relatively hot gas being no lower than a given temperature,
   said fluid dividers each having two outputs,
   a plenum chamber to which one output of each flow divider is connected,
   said flow dividers each further comprising a control port providing a control stream for selectively directing fluid flow into one or the other of said outputs, means connecting said control ports with said plenum chamber so that the control streams are derived therefrom,
   means responsive to the temperature within said plenum for controlling the pressurization of said control ports so that when the temperature in said plenum is above said given temperature, gas from the cool source is dverted into said plenum and when below said given temperature, gas from the hot source is diverted therein,
   means for connecting the other outputs of said flow dividers to said engine so that when gas is diverted therein, it will be returned to the engine, and
   means connecting the plenum chamber to said resonator for flushing the resonator with the constant temperature gas derived from said plenum chamber whereby the reference frequency generated thereby is independent of any changes in the ambient operating temperature of the engine and fuel flow is controlled as a direct function of the rate of turbine rotation.

References Cited

UNITED STATES PATENTS

| | | | |
|---|---|---|---|
| 2,815,915 | 12/1957 | Salerno | 236—13 |
| 2,835,449 | 5/1958 | Joesting | 236—13 |
| 3,198,214 | 8/1965 | Lorenz | 137—81.5 XR |
| 3,267,949 | 8/1966 | Adams | 137—81.5 |
| 3,288,365 | 11/1966 | Shiiki | 137—81.5 XR |

JULIUS E. WEST, *Primary Examiner.*

UNITED STATES PATENT OFFICE
CERTIFICATE OF CORRECTION

Patent No. 3,416,310

December 17, 19

Willis A. Boothe

It is certified that error appears in the above identified patent and that said Letters Patent are hereby corrected as shown below:

Column 5, line 33, "at", second occurrence, should read -- to --. Colum 6, line 29, "dverted" should read -- diverted --.

Signed and sealed this 10th day of March 1970.

(SEAL)
Attest:

Edward M. Fletcher, Jr.
Attesting Officer

WILLIAM E. SCHUYLER, JR.
Commissioner of Patents